Jan. 26, 1965  T. L. HEYING  3,167,590
ORGANOBORON DIOLS AND METHOD FOR THEIR PREPARATION
Filed Nov. 6, 1959
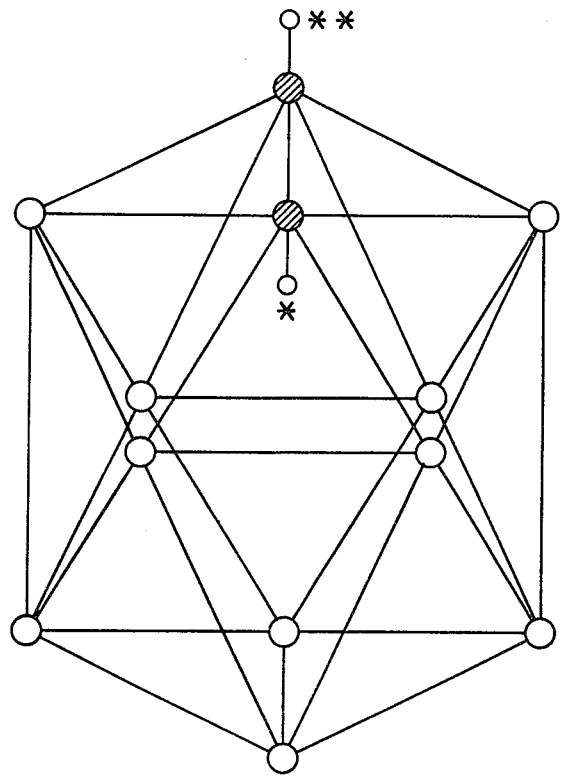
○ BORON
◐ CARBON
○ HYDROGEN ON CARBON
(HYDROGEN ATOMS ON
BORON OMITTED FOR
CLARITY)
*INVENTOR.*
THEODORE L. HEYING
*BY*
Adams Forward and McLean
ATTORNEYS United States Patent Office 3,167,590
Patented Jan. 26, 1965

3,167,590
ORGANOBORON DIOLS AND METHOD FOR THEIR PREPARATION
Theodore L. Heying, Tonawanda, N.Y., assignor to Olin Mathieson Chemical Corporation, a corporation of Virginia
Filed Nov. 6, 1959, Ser. No. 851,475
8 Claims. (Cl. 260—606.5)

This invention relates to organoboron diols and to a method for their preparation.

Application Serial No. 797,809, filed March 6, 1959, describes organoboron esters of the class $$RR'B_{10}H_8(CR''CR''')$$

wherein R and R' are each hydrogen or an alkyl radical containing from 1 to 5 carbon atoms and wherein one of R'' and R''' is hydrogen and one of R'' and R''' is a radical of the class $$R_1O\overset{O}{\underset{\|}{C}}R_2$$

wherein $R_1$ is a bivalent saturated hydrocarbon radical containing 2 to 8 carbon atoms and $R_2$ is a benzyl radical or an alkyl radical containing 1 to 6 carbon atoms. For example, $$B_{10}H_{10}[C(H)C(CH_2CH_2CH_2O\overset{O}{\underset{\|}{C}}CH_3)]$$

can be prepared by refluxing decaborane with 1-pentyn-5-yl acetate while in admixture with acetonitrile and benzene for 72 hours.

According to the present invention it was discovered that compounds of the above class can be reacted successively with an alkali metal alkyl or aryl, a 1,2-alkylene oxide and water to form a reaction mixture comprising an organic phase and an aqueous phase, and that separation and hydrolysis of the organic phase by reaction with a lower alkanol solution of an alkali metal hydroxide produces an organoboron diol of the class $$RR'B_{10}H_8(CR''CR''')$$

wherein R and R' have their previous significance and wherein each of R'' and R''' are hydroxyalkyl radicals containing 2 to 8 carbon atoms.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like, since they are soluble in inert organic solvents. Other alkali metal alkyls, such as the sodium and potassium alkyls can, however, also be employed as can the alkali metal aryls including phenyl lithium.

The 1,2-alkylene oxides useful in the invention include ethylene oxide, propylene oxide, butylene oxide, styrene oxide, octylene oxide and the like.

The ratio of reactants can be varied widely, generally being in the range of 0.1 to 10 moles of alkali metal alkyl per mole of organoboron compound, 0.1 to 20 moles of 1,2-alkylene oxide per mole of organoboron compound and 0.1 to 20 moles of water per mole of organoboron compound. The ratio of reactants is preferably in excess of stoichiometric. The reaction temperature can vary widely, generally from —90° to 80° C. and preferably from —20° to 30° C. The reaction pressure can vary from subatmospheric to several atmospheres, i.e. from 0.2 to 20 atmospheres, although atmospheric pressure reactions are convenient. The reaction between the alkali metal alkyl and the organoboron compound is extremely rapid while the addition of 1,2-alkylene oxide generally requires about one-tenth to 200 hours, depending upon the ratio of reactants, the particular reactants and solvents employed, and the temperature and pressure of the reaction. Advantageously the reaction of the alkali metal alkyl or aryl with the organoboron compound is conducted while the reactants are dissolved in an inert organic solvent such as ether solvents including lower dialkyl ethers, tetrahydrofuran, dioxane, ethylene and polyethylene glycol monoalkyl and dialkyl ethers, and hydrocarbon solvents including n-pentane, hexane and heptane, aromatic hydrocarbon solvents such as benzene, toluene, and xylene, and cyclo-aliphatic solvents such as cyclohexane and methylcyclohexane. The amount of solvent can vary widely but generally ranges up to about 50 times the weight of the reactants.

The organic layer is separated and the ester group is hydrolyzed by reaction with a lower alkanol solution of an alkali metal hydroxide to form the organoboron diol.

Lower alkanols which can be are methanol, ethanol, n-propanol, isopropanol, n-butanol, isobutanol, and tertiary butanol, the reactants not being as soluble in the higher alkanols.

Potassium hydroxide is preferred as the alkali metal hydroxide because it is more soluble in the lower alkanol but other alkali metal hydroxides such as sodium and lithium hydroxides can be used.

In the complete absence of water, the ester is hydrolyzed but the alkali metal alcoholate is produced instead of the alcohol. Hence the alkanol solution advantageously contains a small amount of water. The amount of water present should not, however, be so great as to reduce appreciably the solubility of the organoboron ester in the alkali metal hydroxide solution. Separation of the product is then accomplished by acidification of the solution or precipitation of the product from the solution, followed by removal of the product.

The ratio of reactants in the hydrolysis of the organoboron esters can be varied widely, generally being in the range of from 0.01 to 10 moles of alkali metal hydroxide per equivalent of ester (i.e. per mole of carboxylic acid liberated by the hydrolysis) and preferably in the range of from 1 to 6 moles of alkali metal hydroxide per equivalent of ester. Sufficient alcohol can be present to produce a solution containing 1 percent alkali metal hydroxide to a saturated solution of alkali metal hydroxide. The reaction temperature can vary widely, generally being from 0 to 150° C. and preferably between 20 and 80° C. The reaction pressure can vary from subatmospheric to several atmospheres, i.e., from 0.2 to 20 atmospheres, although atmospheric pressure reactions are convenient. The degree of completeness of the reaction can be determined by analysis of the reaction mixture. The reaction generally requires from one tenth to ten hours and preferably from one half to three hours, depending upon the ratio of reactants, the particular reactants and solvents employed and the temperature and pressure of the reaction.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants product by the methods described in this application burn uniformly without disintegration when ignited by conventional means, such as a pyrotechnic type igniter, and are mechanically strong enough to withstand ordinary handling.

The process of the invention is illustrated in detail by the following example:

Example

A 250 ml. three-neck round bottom flask is fitted with a stirrer, addition funnel and reflux condenser capped with a calcium chloride drying tube. In the flask are placed 15.6 g. of decaborane, 100 ml. of benzene and 10 g. of acetonitrile. The mixture is allowed to reflux for 1 hour and 15.8 grams of 1-pentyn-5-yl acetate are then slowly added. Reflux is maintained for an additional 72 hours. After cooling, the benzene is evaporated and the residue is distilled at less than 0.1 mm. Hg absolute to give 22 grams (72%) of $$B_{10}H_{10}[C(H)C(CH_2CH_2CH_2O\overset{\overset{O}{\|}}{C}CH_3)]$$

The ester is dissolved in about 100 ml. of diethyl ether and an equimolar quantity of n-butyl lithium in n-heptane is slowly added followed by the slow addition of a solution of 6 g. of ethylene oxide in 100 ml. of diethyl ether. A vigorous reaction occurs and after subsiding, the mixture is stirred for an additional hour and poured into water. The ethereal layer is separated, washed well with water, dried, filtered and the ether is removed. The resulting oil is immediately dissolved in 150 ml. of saturated ethanolic potassium hydroxide and stirred overnight at room temperature. The solution is then poured into dilute hydrochloric acid and the resulting slightly yellow solid is removed by filtration and pressed dry on the suction funnel. Mass spectrometric analysis indicates the presence of $B_{10}H_{10}[C(CH_2CH_2OH)C(CH_2CH_2CH_2OH)]$.

The compound of the formula $$B_{10}H_{10}[C(CH_2CH_2OH)C(CH_2CH_2CH_2OH)]$$

has the same structural formula as shown in the accompanying drawing except that the hydrogen atom indicated by the single asterisk is replaced by the radical

—$CH_2CH_2OH$ and the hydrogen atom indicated by the double asterisk is replaced by the radical —$CH_2CH_2CH_2OH$.

The organoboron diols of the present invention can be oxidized to the corresponding organoboron dicarboxylic acids by reaction with any of the conventional agents ordinarily employed for oxidation of alcohols to carboxylic acids according to the method described in copending application Serial No. 812,066 filed May 8, 1959, of John W. Ager, Jr., et al.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artifical material, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneously removal of solvent, and following this the solvent free mixture can be molded into the desired shape as by extrusion. Thereafter, the resin can be cured by resorting to heating at moderate temperatures. For further information concerning the formulation of solid propellant compositions reference is made to U.S. Patent 2,622,277 to Bonnell and to U.S. Patent 2,646,596 to Thomas.

I claim:

1. A method for the preparation of organoboron diols which includes reacting successively with a material selected from the class consisting of alkali metal alkyls and alkali metal aryls, a 1,2-alkylene oxide, and water, a compound of the class $RR'B_{10}H_8(CR''CR''')$ wherein R and R' are each selected from the class consisting of hydrogen and an alkyl radical containing from 1 to 5 carbon atoms and wherein one of R'' and R''' is hydrogen and one of R'' and R''' is a radical of the class $$R_1O\overset{\overset{O}{\|}}{C}R_2$$

wherein $R_1$ is a bivalent saturated hydrocarbon radical containing 2 to 8 carbon atoms and $R_2$ is a radical selected from the class consisting of a benzyl radical and an alkyl radical containing 1 to 6 carbon atoms, separating aqueous and organic phases of the resulting mixture, and hydrolyzing the organic phase by reaction with a lower alkanol solution of an alkali metal hydroxide.

2. The method of claim 1 wherein the said material is an alkali metal alkyl.

3. The method of claim 2 wherein the alkli metal alkyl is n-butyl lithium.

4. The method of claim 1 wherein the 1,2-alkylene oxide is ethylene oxide.

5. The method of claim 1 wherein the organoboron compound is $$B_{10}H_{10}[C(H)C(CH_2CH_2CH_2O\overset{\overset{O}{\|}}{C}CH_3)]$$

6. The method of claim 1 wherein the lower alkanol is ethanol.

7. The method of claim 1 wherein the alkali metal hydroxide is potassium hydroxide.

8. The method of claim 2 wherein the alkali metal alkyl is n-butyl lithium, wherein the 1,2-alkylene oxide is ethylene oxide, wherein the organoboron compound is $$B_{10}H_{10}[C(H)C(CH_2CH_2CH_2O\overset{\overset{O}{\|}}{C}CH_3)]$$

wherein the lower alkanol is ethanol, and wherein the alkali metal hydroxide is potassium hydroxide.

No references cited.